US012163665B2

(12) United States Patent
Bouten (10) Patent No.: US 12,163,665 B2
(45) Date of Patent: Dec. 10, 2024

(54) NOZZLE AND FUEL SYSTEM FOR OPERATION ON GAS WITH VARYING HEATING VALUE

(71) Applicant: OPRA Technologies BV, Hengelo (NL)

(72) Inventor: Thijs Wilhelmus Felix Maria Bouten, Amersfoort (NL)

(73) Assignee: OPRA Technologies BV, Hengelo (NL)

( * ) Notice: Subject to any disclaimer, the term of this patent is extended or adjusted under 35 U.S.C. 154(b) by 79 days.

(21) Appl. No.: 16/505,343

(22) Filed: Jul. 8, 2019

(65) Prior Publication Data

US 2021/0010675 A1 Jan. 14, 2021

(51) Int. Cl.
*F23R 3/36* (2006.01)
*F02C 7/22* (2006.01)
(Continued)

(52) U.S. Cl.
CPC .............. *F23R 3/36* (2013.01); *F02C 7/222* (2013.01); *F02C 7/232* (2013.01); *F23R 3/30* (2013.01); *F23R 2900/00002* (2013.01)

(58) Field of Classification Search
CPC ...... F23R 3/36; F23R 3/28; F23R 3/30; F23R 2900/00002; F02C 7/222; F02C 7/232; F02C 7/22
See application file for complete search history.

(56) References Cited

U.S. PATENT DOCUMENTS 4,761,948 A * 8/1988 Sood .................... F02C 9/40
60/39.281

4,833,878 A * 5/1989 Sood .................... F02C 9/40
60/39.463
(Continued)

FOREIGN PATENT DOCUMENTS

EP 1 526 333 A1 4/2005
EP 2230458 A1 9/2010
(Continued)

OTHER PUBLICATIONS

International Search Report and Written Opinion issued Oct. 15, 2020, for corresponding PCT Int'l Patent Application No. PCT/IB2020/000581.
(Continued)

*Primary Examiner* — Gerald L Sung
*Assistant Examiner* — Jacek Lisowski
(74) *Attorney, Agent, or Firm* — Finnegan, Henderson, Farabow, Garrett & Dunner, LLP (57) ABSTRACT

A fuel nozzle assembly for a gas turbine combustion chamber includes a housing having a first port connected to a first low calorific gas supply, a second port separate from the first port and connected to a second low calorific gas supply, and a third port separate from the first port and the second port and connected to a high calorific fuel supply. The fuel nozzle assembly may further include a first gallery in the housing connected to the first port, a second gallery in the housing separate from the first gallery and connected to the second port, and a third gallery in the housing separate from the first and second galleries and connected to the third port. The fuel nozzle assembly may further include a plurality of injection holes circumferentially disposed in the housing and configured to inject gas from each respective gallery into a can combustor.

14 Claims, 4 Drawing Sheets

(51) Int. Cl.
  *F02C 7/232* (2006.01)
  *F23R 3/30* (2006.01)

(56) References Cited

U.S. PATENT DOCUMENTS

| | | | |
|---|---|---|---|
| 6,148,608 A | 11/2000 | Althaus | |
| 2001/0027637 A1* | 10/2001 | Norster | F23D 14/24 60/773 |
| 2004/0011054 A1* | 1/2004 | Inoue | F23R 3/10 60/776 |
| 2012/0291446 A1* | 11/2012 | Hirata | F23R 3/286 60/772 |
| 2013/0029277 A1* | 1/2013 | Koizumi | F23R 3/343 431/354 |
| 2014/0069079 A1* | 3/2014 | Koizumi | F23R 3/12 60/39.463 |
| 2015/0059353 A1* | 3/2015 | Asai | F02C 3/22 60/778 |
| 2015/0354823 A1* | 12/2015 | Koizumi | F23R 3/286 60/737 |
| 2017/0298884 A1* | 10/2017 | Patel | F02M 61/16 |
| 2018/0363907 A1* | 12/2018 | Purcell | F23R 3/286 |

FOREIGN PATENT DOCUMENTS

| | | |
|---|---|---|
| EP | 2551596 A2 | 1/2013 |
| WO | WO 2017/005694 A1 | 1/2017 |

OTHER PUBLICATIONS

Examination Report for GB2201529.1, dated Sep. 1, 2023, 3 pages.
Office Action in German Application No. 11 2020 003 262.0, dated Feb. 14, 2024, 10 pages.
Intention to Grant GB2201529.1, dated Feb. 7, 2024, 2 pages.
Examination Report for GB2201529.1, dated Jan. 8, 2024, 4 pages.

* cited by examiner

//NOZZLE AND FUEL SYSTEM FOR OPERATION ON GAS WITH VARYING HEATING VALUE

FIELD OF THE INVENTION

The present invention relates to nozzles and fuel systems for operation on gas with varying heating value, for example, in operation with can combustors for gas turbines.

BACKGROUND OF THE INVENTION

Improvements are possible in the configuration of nozzle assemblies for use in can combustors and in the control of air and air/fuel mixture flows in the can combustors using gas fuel with a low calorific value, which flows affect the completeness of the burning, and thus the level of emissions and the thermal efficiency of the combustor. Such improvements are set forth hereinafter.

SUMMARY OF THE INVENTION

According to an embodiment of the present disclosure, a fuel nozzle assembly for a gas turbine combustion chamber is provided. The fuel nozzle assembly may include a housing having a first port connected to a first low calorific gas supply, a second port separate from the first port and connected to a second low calorific gas supply, and a third port separate from the first port and the second port and connected to a high calorific fuel supply. The fuel nozzle assembly may further include a first gallery in the housing connected to the first port, a second gallery in the housing separate from the first gallery and connected to the second port, a third gallery in the housing separate from the first and second galleries and connected to the third port, a plurality of injection holes circumferentially disposed in the housing, the plurality of injection holes including a first portion connected to the first gallery, a second portion connected to the second gallery, and a third portion connected to the third gallery, the plurality of injection holes configured to inject gas from each respective gallery into a can combustor.

In some embodiments, the fuel nozzle assembly may include at least one insulation layer positioned between each of the first gallery, the second gallery, and the third gallery. The fuel nozzle assembly may further include a fuel system that controls the first low calorific gas supply, the second low calorific gas supply, and the high calorific fuel supply. The fuel system may include a control valve connected to a low calorific gas controlling the first low calorific gas supply and the second low calorific gas supply, a control valve connected to a high calorific fuel controlling the high calorific fuel supply. The fuel system may further include a shutoff valve that is connected to and controls at least one of the first low calorific gas supply and the second low calorific gas supply. The fuel system may automatically switch between providing the first low calorific gas supply and the second low calorific gas supply to the housing thereby controlling utilization the second gallery and the third gallery. The fuel system may automatically switch between providing one of the first low calorific gas supply and the second low calorific gas supply to the housing and both the first and second low calorific gas supplies to the housing, thereby controlling utilization the second gallery and the third gallery.

In some embodiments, the fuel system is operable in a dual-gas mode where the fuel system operates on one of the low calorific gas and the high calorific fuel. In some embodiments, the fuel system is operable in a bi-gas mode where the fuel system operates on both the low calorific gas and the high calorific fuel simultaneously.

The third portion of injection holes may each include a radial and tangential angle that provide radially outward swirling for the high calorific fuel in the third gallery. The first low calorific gas supply, the second low calorific gas supply, and the high calorific fuel supply may be coaxially arranged in the housing and gas swirling of the first, second, and third galleries is separated from air swirling from an air source. The first gallery may include a liquid fuel nozzle, and the liquid fuel nozzle may include a liquid fuel atomizer.

According to embodiments of the present disclosure, a fuel nozzle assembly for a gas turbine combustion chamber is provided. The fuel nozzle assembly may include a fuel system that controls a first low calorific gas supply, a second low calorific gas supply, and a high calorific fuel supply. The assembly may include a housing having a first port connected to the first low calorific gas supply, a second port separate from the first port and connected to the second low calorific gas supply, and a third port separate from the first port and the second port and connected to the high calorific fuel supply. The fuel nozzle assembly may also include a first gallery in the housing connected to the first port, a second gallery in the housing separate from the first gallery and connected to the second port, a third gallery in the housing separate from the first and second galleries and connected to the third port. In some embodiments, the fuel nozzle assembly may include a plurality of injection holes circumferentially disposed in the housing, the plurality of injection holes including a first portion connected to the first gallery, a second portion connected to the second gallery, and a third portion connected to the third gallery, the plurality of injection holes configured to inject gas from each respective gallery into a can combustor. The fuel system may automatically switch between providing one of the first low calorific gas supply and the second low calorific gas supply to the housing and both the first and second low calorific gas supplies to the housing, thereby controlling utilization the second gallery and the third gallery.

In some embodiments, the fuel system further includes a shutoff valve that is connected to and controls at least one of the first low calorific gas supply and the second low calorific gas supply. The fuel system may be operable in a dual-fuel mode where the fuel system operates on one of the low calorific gas and the high calorific fuel. The fuel system may be operable in a bi-fuel mode where the fuel system operates on both the low calorific gas and the high calorific fuel simultaneously.

In some embodiments, the third portion of injection holes each include a radial and tangential angle that provide radially outward swirling for the high calorific fuel in the third gallery. The first low calorific gas supply, the second low calorific gas supply, and the high calorific fuel supply may be coaxially arranged in the housing and gas swirling of the first, second, and third galleries is separated from air swirling from an air source. The third portion of injection holes may each include a radial and tangential angle that provide radially outward swirling for the high calorific fuel in the third gallery. The first gallery may include a liquid fuel nozzle.

The accompanying drawings, which are incorporated in and constitute a part of this specification, illustrate an embodiment of the invention and, together with the description, serve to explain the principles of the invention.

DESCRIPTION OF THE EMBODIMENT

The can combustor of the present invention, generally designated by the numeral 10 in the figures, is intended for use in combusting fuel having a low calorific value fuel with compressed air from compressor 6, and delivering combustion gases to gas turbine 8, e.g., for work-producing expansion such as in a gas turbine engine. See FIG. 1. Compressor 6 may be a centrifugal compressor and gas turbine 8 may be a radial inflow turbine, but these are merely preferred and are not intended to limit the scope of the present invention, which is defined by the appended claims and their equivalents. Disclosure of this embodiment with respect to the usage of low calorific value fuel is not intended to be limiting. Aspects of the embodiment may also provide advantages when used with higher calorific value fuels.

In accordance with the present invention, as embodied and broadly described herein, the can combustor 10 may include a generally cylindrical housing having an interior, a longitudinal, an annular inlet for receiving compressed air at one longitudinal end, axis with the other longitudinal end being closed. As embodied herein, and with reference to FIG. 1, can combustor 10 includes outer housing 12 having interior 14, annular inlet 18 configured to receive compressed air from compressor 6.

In accordance with the present invention, the combustor may also include a generally cylindrical combustor liner coaxially disposed in the housing interior and configured to define with the housing a generally annular passage for the compressed air received through the inlet. The liner also defines respective radially inner volumes for a combustion zone and a dilution zone. The dilution zone is axially distant the closed housing end relative to the combustion zone, and the combustion zone is axially adjacent the closed housing end.

Figure 1:
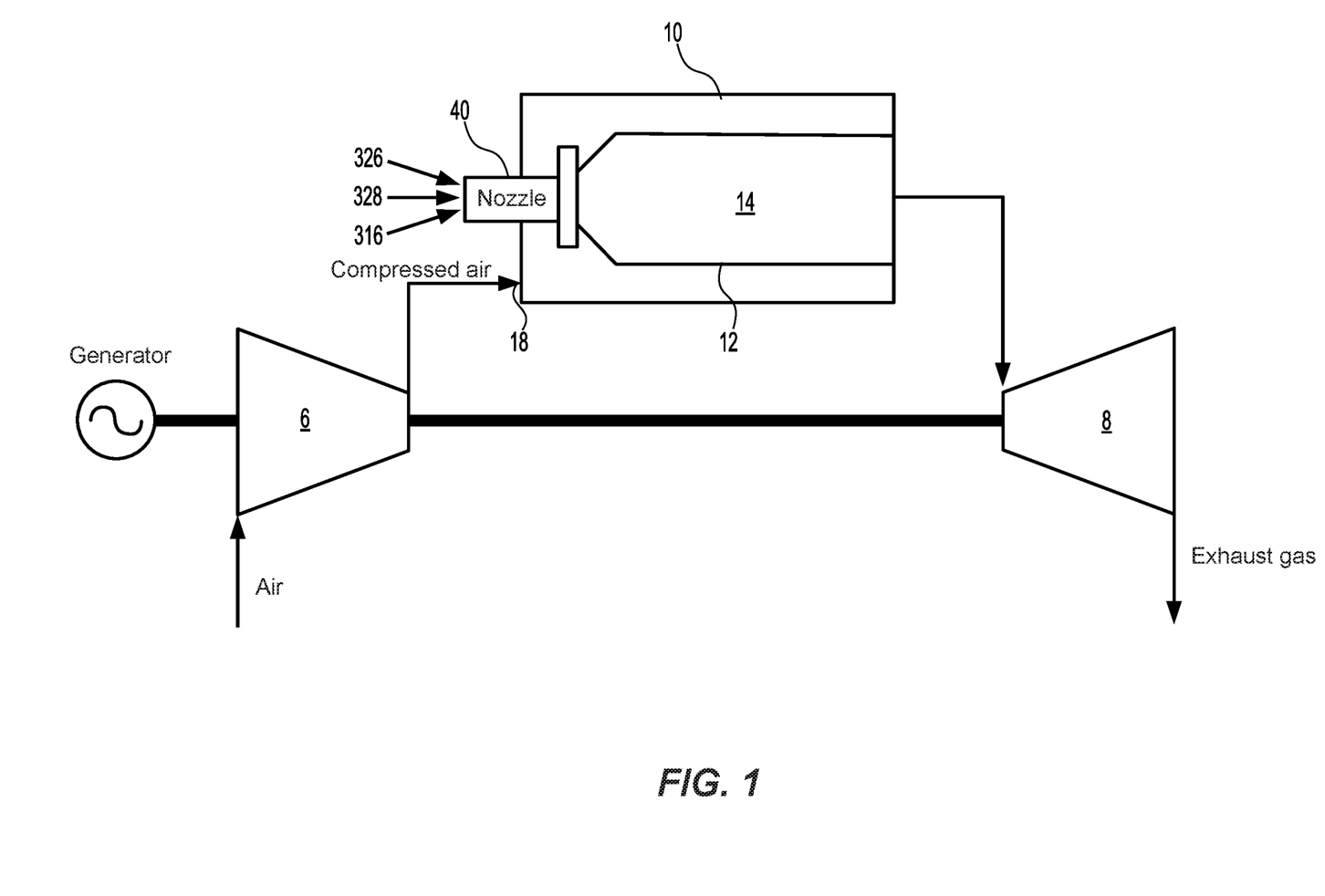
FIG. 1 is a schematic illustration of a gas turbine and can combustor according to embodiments of this disclosure.

Interior 14 defines a combustion zone, where compressed air and fuel are combusted to produce hot combustion gases. In conjunction with fuel nozzle assembly 40, combustor 10 is configured to provide stable recirculation promoting primary combustion in a recirculation region of a combustion zone, in a manner known to those skilled in the art. The combustion zone may further include an intermediate region for secondary combustion. The combustor 10 may also have a dilution zone where combustion gases are mixed with dilution air from dilution ports to lower the temperature of the combustion gases, before work-producing expansion in turbine 8.

Also in accordance with the present invention, the combustor includes fuel nozzle assembly 40 disposed at the closed housing end and configured to inject fuel into the combustion zone. The nozzle assembly 40 also may have a plurality of swirl vanes circumferentially disposed about the nozzle to induce a swirling flow pattern of the fuel/air mixture. Further, the fuel nozzle assembly may be disposed coaxially with the liner. As described in reference to FIGS. 1 and 2, fuel system 300 may provide high calorific fuel supply 316, first calorific gas supply 326, and second low calorific gas supply 328 to nozzle assembly 40.

Figure 2:
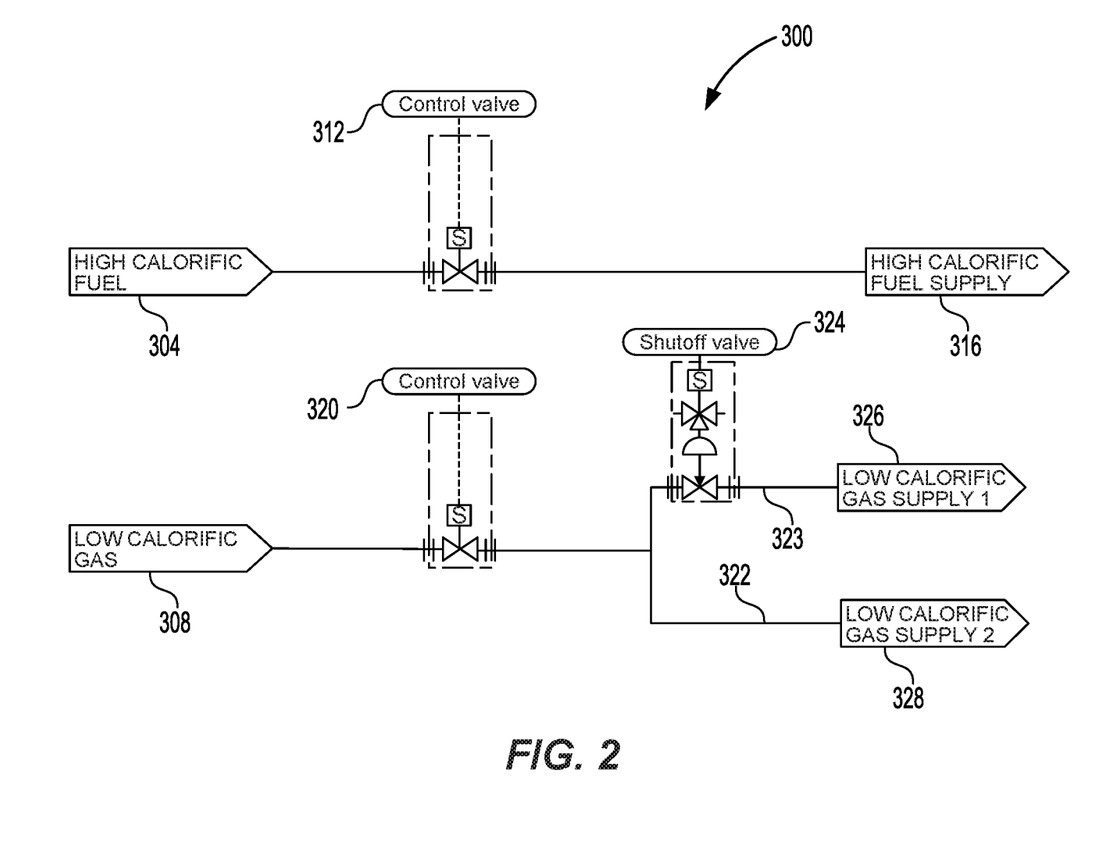
FIG. 2 is a schematic illustration of a fuel system according to embodiments of this disclosure.
Figure 3:
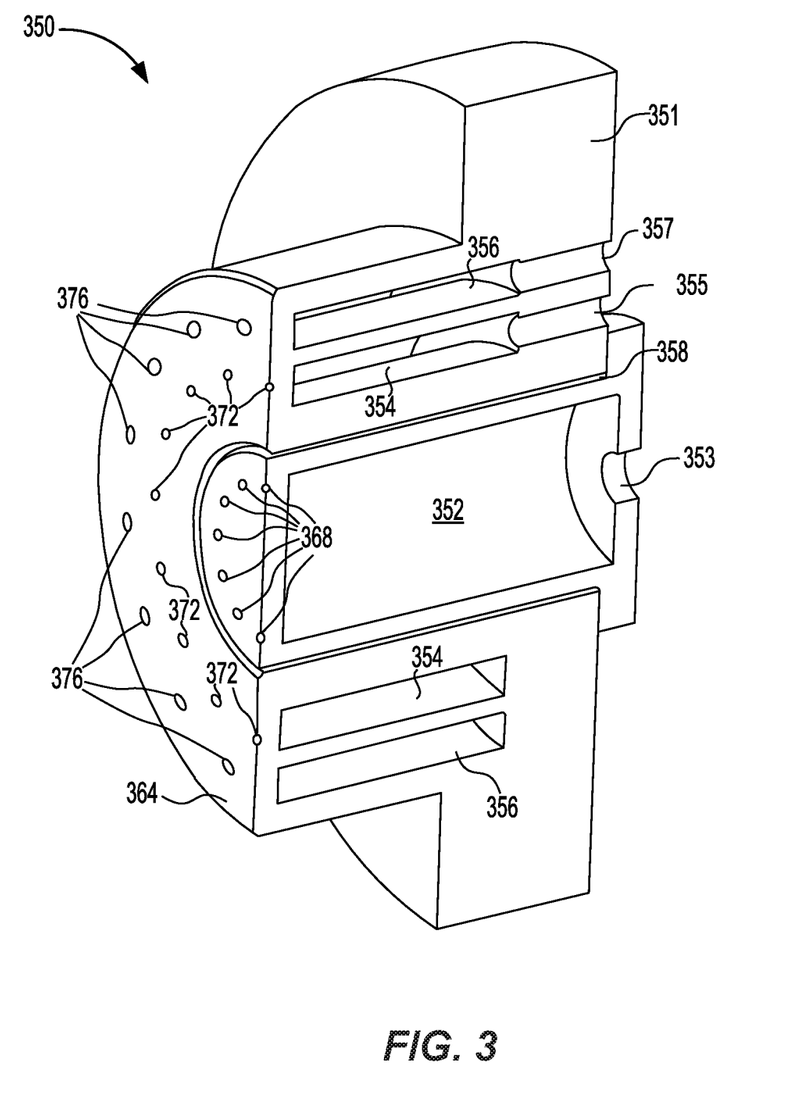
FIG. 3. is a perspective cross-sectional view of a nozzle assembly according to embodiments of this disclosure.
Figure 4:
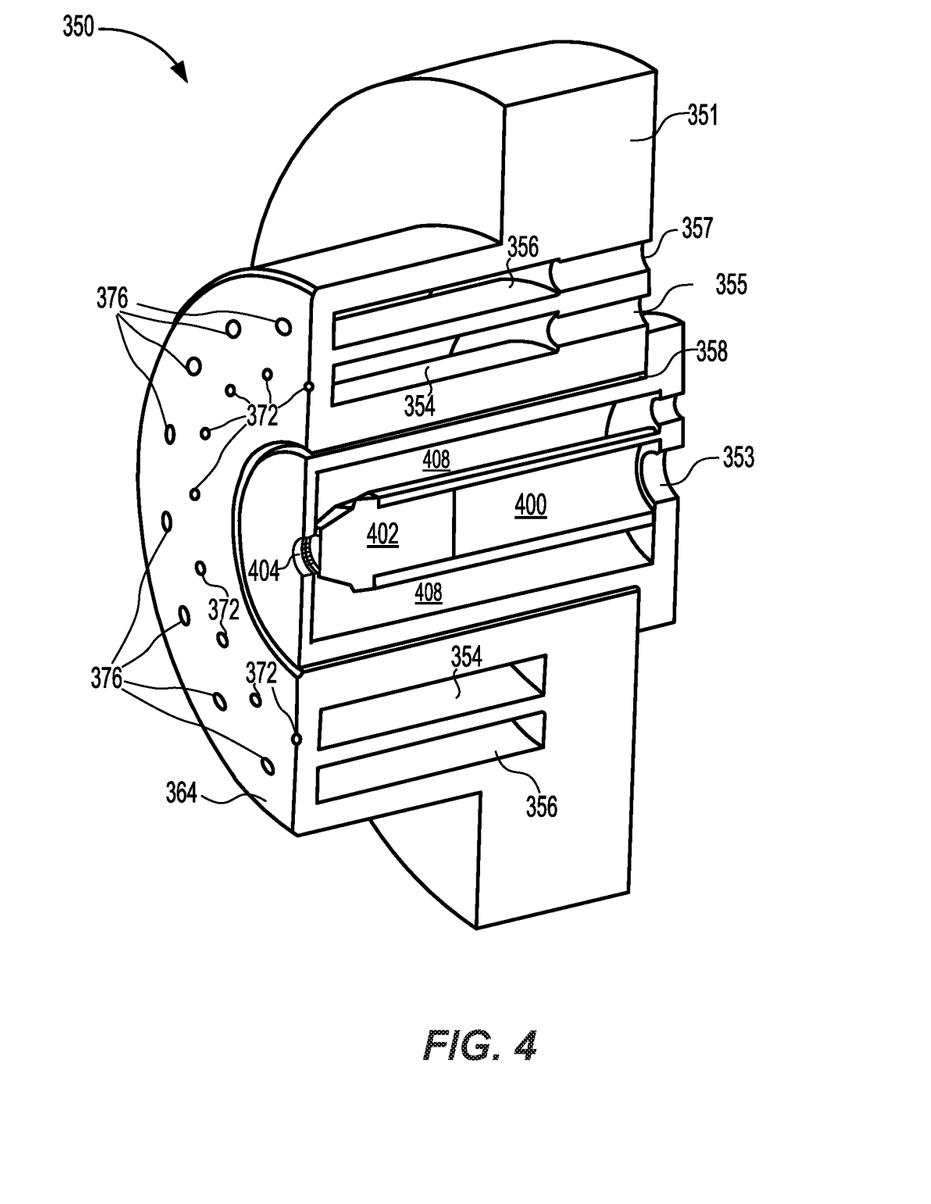
FIG. 4 is a perspective cross-sectional view of a nozzle assembly according to embodiments of this disclosure.

FIG. 1 is a schematic illustration of a gas turbine and can combustor. FIGS. 2-4 illustrate details of the schematic illustration of FIG. 1. As described with reference to FIGS. 3 and 4, nozzle assembly 40 shown in FIG. 1 may be replaced with a fuel system 300 (FIG. 2) and a nozzle assembly 350 (FIGS. 3 and 4), which may be interchangeable with nozzle assembly 40 such that fuel system 300 and nozzle assembly 350 interface with can combustor 10 in the same or a similar manner as nozzle assembly 40.

FIG. 2 illustrates schematic fuel system 300 for the supply of low and high calorific fuel to the nozzle for operation on a gas with varying heating value. The high calorific fuel may also be a liquid fuel. Fuel system 300 may have two independent supplies, for example a high calorific fuel 304 and a low calorific gas 308. The gas supplies of high calorific fuel 304 and low calorific gas 308 are not mixed to avoid condensation issues which may arise in instances where one of the gas supplies has a high dew point. In some embodiments, the high calorific fuel 304 may have a constant or nearly constant heating value. The high calorific fuel 304 with nearly constant heating value may be controlled by a control valve 312 and that selectively provides a high calorific fuel supply 316 to the nozzle assembly 350.

The low calorific gas 308 may have a heating value that is variable such that the heating value may strongly fluctuate. The low calorific gas 308 may be controlled by a control valve 320. The control valve 320 may control supplying the low calorific gas 308 to one or more supply lines 322, 323 that may connect to either one or two galleries of the nozzle assembly 350 as described below. The low calorific gas 308 may be controlled by a shutoff valve 324 on at least one of the supply lines 322, 323. Accordingly, a first low calorific gas supply 326 and a second low calorific gas supply 328 may be provided to the nozzle assembly 350.

The fuel system 300 may be operable on two different gaseous fuels (e.g. high calorific fuel 304 and low calorific gas 308), either in a dual-fuel mode where system 300 operates on one of the fuels, or a bi-fuel mode where system 300 operates on both fuels simultaneously. For example, in dual-fuel mode, system 300 may supply high calorific fuel 304 to nozzle assembly 350 without supplying low calorific gas 308 to nozzle assembly 350. In another example, in dual-fuel mode, system 300 may supply low calorific gas 308 to nozzle assembly 350 without supplying high calorific fuel 304 to nozzle assembly. Additionally or alternatively, in bi-fuel mode, system 300 may simultaneously supply high calorific fuel 304 and low calorific gas 308 to nozzle assembly 350.

As illustrated in FIG. 3, the nozzle assembly 350 may have a housing 351 including three galleries, a first gallery 352, a second gallery 354, and a third gallery 356. Each of the galleries may have an inlet port and an outlet. The first gallery 352 may have port 353, second gallery 354 may have port 355, and third gallery 356 may have port 357. The three galleries 352, 354, 356 may be coaxially arranged in the nozzle assembly 350. The high calorific fuel supply 316 may be connected to first gallery 352 via port 353, first gallery 352 may be thermally insulated by an insulation layer 358 (e.g. by an air gap) to prevent heat transfer between the independent fuel supplies, the thermal insulation may prevent potential fuel condensation that may be caused by heat transfer between the fuel supplies. The second gallery 354 and the third gallery 356 may extend circumferentially around the first gallery 352 at radial distances from the first gallery 352. In some embodiments, first gallery 352 may be centrally positioned in housing 351, with second gallery 354 and third gallery positioned at radial distances from the center of the housing 351.

The nozzle assembly 350 may include second gallery 354 and third gallery 356 connected to the low calorific gas supplies 326, 328 via ports 355, 357 respectively. Separate galleries (e.g. second gallery 354 and third gallery 356) may be implemented since the range of heating values for the low calorific gas 308 can be wide (e.g. the nozzle covers the range from LHVm/5 up to LHVm, where the LHVm is the maximum value the nozzle is designed for (e.g. 5-25 MJ/m3). In some embodiments, one of the second gallery 354 and third gallery 356 may be utilized when there is a low gas flow into the nozzle assembly 350 (e.g. in case of a high heating value). In other embodiments, two galleries (e.g. both the second gallery 354 and third gallery 356) are used in case of a high gas flow (e.g. in case of a low heating value).

The housing 351 may include a plurality of injection holes on an outlet side 364 of housing 351. A first group 368 of injection holes may be positioned on the outlet side 364 of housing 351, and the first group 368 of injection holes may be connected to and aligned with first gallery 352. The first group 368 of injection holes may each include a radial and tangential angle that may provide radially outward swirling for the high calorific fuel in first gallery 352. First gallery 352 may a radial outward swirling injection holes (e.g. first group 368) that do not interfere with the recirculation backflow of the can combustor 10.

A second group 372 of injection holes may be positioned on the outlet side 364 of housing 351, and the second group 372 of injection holes may be connected to and aligned with second gallery 354. A third group 376 of injection holes may be positioned on the outlet side 364 of housing 351, and the third group 376 of injection holes may be connected to and aligned with third gallery 356. Each of the first group 368, second group 372, and third group 376 may be positioned in a circular pattern around outlet side 364 of housing 351 such that each group is in a pattern that aligns with each respective gallery the group is connected to. The injection holes of the second group 372 and third group 376 may each include a radial and tangential angle that may provide radially outward swirling for the low calorific gas in second gallery 354 and third gallery 356, respectively. First gallery 352 may be radial outward swirling injection holes (e.g. first group 368) that do not interfere with the recirculation backflow of the can combustor 10. The fuel through all three fuel galleries (first gallery 352, second gallery 354, and third gallery 356) may be injected with an angle to not cancel the effect of the independent air swirling for flame stabilization in the can combustor 10 discussed herein.

FIG. 4 illustrates another embodiment of nozzle assembly 350, in which first gallery 352 is replaced with a liquid fuel nozzle 400. The liquid fuel nozzle 400 may be connected to a liquid fuel supply. The liquid fuel nozzle 400 may have a liquid fuel atomizer 402 on the outlet side of the liquid fuel nozzle 400. The liquid fuel atomizer 402 may transform liquid from the liquid fuel supply into a collection of drops. Housing 350 may have an injection hole 404 that may outlet the liquid fuel from the liquid fuel nozzle 400. Additionally, the liquid fuel nozzle 400 may have an air chamber 408 that circumferentially surrounds the liquid fuel nozzle 400 and is positioned between the liquid fuel nozzle 400 and insulation layer 358.

A control system may monitor relevant parameters in gas fuel system 300, including opening and closing each control valve 312, 320, shutoff valve 324, gas pressures and temperatures (e.g. pressures and temperatures of high calorific fuel 304, low calorific gas 308). Based on the parameters, the shutoff valve 324 for one of the low calorific gas supplies 326, 328 may be operated to ensure sufficient and controlled pressure drop over the nozzle assembly 350. The control sequence monitors relevant operating conditions and may automatically switch between utilizing one of the second gallery 354 and third gallery 356 and both galleries (e.g. concurrently utilizing second gallery 354 and third gallery 356) for low calorific gas fuel injection.

Combustor 10, as described above, may provide advantages when burning low-calorific fuel. The introduction of compressed air into an intermediate region 38 of combustion zone 32 may serve to facilitate complete combustion, i.e., reducing or eliminating an amount of uncombusted fuel as well as for emission control (e.g. of CO and NOx). It will be apparent to those skilled in the art that various modifications and variations can be made in the disclosed can combustor, without departing from the teachings contained herein. Although embodiments will be apparent to those skilled in the art from consideration of this specification and practice of the disclosed apparatus, it is intended that the specification and examples be considered as exemplary only, with the true scope being indicated by the following claims and their equivalents.

What is claimed is:

1. A fuel nozzle assembly for a gas turbine combustion chamber, the fuel nozzle assembly comprising:
   a housing having a first port connected to a first low calorific gas supply, a second port separate from the first port and connected to a second low calorific gas supply, and a third port separate from the first port and the second port and connected to a high calorific fuel supply, the high calorific fuel supply comprising a gas fuel;
   a first gallery in the housing connected to the first port;
   a second gallery in the housing separate from the first gallery and connected to the second port;
   a third gallery in the housing separate from the first and second galleries and connected to the third port;
   a plurality of injection holes disposed in the housing, the plurality of injection holes including a first portion connected to the first gallery, a second portion connected to the second gallery, and a third portion connected to the third gallery,
   wherein the first portion and second portion of the plurality of injection holes are configured to inject gas from each respective first and second gallery into a can combustor, and the third portion of the plurality of injection holes is configured to inject high calorific fuel from the third gallery into the can combustor;
   wherein the first portion of the plurality of injection holes is disposed in a first circular pattern, the second portion of the plurality of injection holes is disposed in a second circular pattern, and the third portion of the plurality of injection holes is disposed in a third circular pattern,
   with each injection hole of the third portion being aligned at an angle relative toa central axis, the angle comprising both radial and tangential components that provide radially outward swirling for the high calorific fuel in the third gallery;
   wherein the first, second, and third circular patterns are concentric, with the second circular pattern being outside of the first circular pattern and inside the third circular pattern, and
   wherein no air source is provided inside of the third circular pattern.

2. The fuel nozzle assembly of claim 1 further comprising:
at least one insulation layer positioned between each of the first gallery, the second gallery, and the third gallery.

3. The fuel nozzle assembly of claim 1 further comprising:
a fuel system that controls the first low calorific gas supply, the second low calorific gas supply, and the high calorific fuel supply, the fuel system including:
a single control valve connected to a low calorific gas controlling the first low calorific gas supply and the second low calorific gas supply;
a control valve connected to a high calorific fuel controlling the high calorific fuel supply.

4. The fuel nozzle assembly of claim 3 wherein:
the fuel system further includes a shutoff valve that is connected to and controls at least one of the first low calorific gas supply and the second low calorific gas supply.

5. The fuel nozzle assembly of claim 4 wherein:
the fuel system automatically switches between providing the first low calorific gas supply and the second low calorific gas supply to the housing thereby controlling utilization of the first gallery and the second gallery.

6. The fuel nozzle assembly of claim 4 wherein:
the fuel system automatically switches between providing one of the first low calorific gas supply and the second low calorific gas supply to the housing and both the first and second low calorific gas supplies to the housing, thereby controlling utilization of the first gallery and the second gallery.

7. The fuel nozzle assembly of claim 4 wherein:
the fuel system is operable in a dual-fuel mode where the fuel system operates on one of the low calorific gas and the high calorific fuel.

8. The fuel nozzle assembly of claim 4 wherein:
the fuel system is operable in a bi-fuel mode where the fuel system operates on both the low calorific gas and the high calorific fuel simultaneously.

9. The fuel nozzle assembly of claim 1 wherein:
the first, second, and third galleries are coaxially arranged in the housing and gas swirling of the first, second, and third galleries is separated from air swirling from an air source.

10. A fuel nozzle assembly for a gas turbine combustion chamber, the fuel nozzle assembly comprising:
a fuel system that controls a first low calorific gas supply, a second low calorific gas supply, and a high calorific fuel supply, the high calorific fuel supply comprising a gas fuel;
a housing having a first port connected to the first low calorific gas supply, a second port separate from the first port and connected to the second low calorific gas supply, and a third port separate from the first port and the second port and connected to the high calorific fuel supply;
a first gallery in the housing connected to the first port;
a second gallery in the housing separate from the first gallery and connected to the second port;
a third gallery in the housing separate from the first and second galleries and connected to the third port; and
a plurality of injection holes disposed in the housing, the plurality of injection holes including a first portion connected to the first gallery, a second portion connected to the second gallery, and a third portion connected to the third gallery,
wherein the first portion and second portion of the plurality of injection holes are configured to inject gas from each respective first and second gallery into a can combustor, and the third portion of the plurality of injection holes is configured to inject high calorific fuel from the third gallery into the can combustor;
wherein the fuel system automatically switches between providing one of the first low calorific gas supply and the second low calorific gas supply to the housing and both the first and second low calorific gas supplies to the housing, thereby controlling utilization in the first gallery and the second gallery;
wherein the first portion of the plurality of injection holes is disposed in a first circular pattern, the second portion of the plurality of injection holes is disposed in a second circular pattern, and the third portion of the plurality of injection holes is disposed in a third circular pattern,
with each injection hole of the third portion being aligned at an angle relative toa central axis, the angle comprising both radial and tangential components that provide radially outward swirling for the high calorific fuel in the third gallery:
wherein the first, second, and third circular patterns are concentric, with the second circular pattern being outside of the first circular pattern and inside the third circular pattern, and
wherein no air source is provided inside of the third circular pattern.

11. The fuel nozzle assembly of claim 10 wherein:
the fuel system further includes a shutoff valve that is connected to and controls at least one of the first low calorific gas supply and the second low calorific gas supply.

12. The fuel nozzle assembly of claim 10 wherein:
the fuel system is operable in a dual-fuel mode where the fuel system operates on one of a low calorific gas and a high calorific fuel.

13. The fuel nozzle assembly of claim 10 wherein:
the fuel system is operable in a bi-fuel mode where the fuel system operates on both the low calorific gas and the high calorific fuel simultaneously.

14. The fuel nozzle assembly of claim 10 wherein:
the first, second, and third galleries are arranged in the housing and gas swirling of the first, second, and third galleries is separated from air swirling from an air source.

* * * * *

UNITED STATES PATENT AND TRADEMARK OFFICE
CERTIFICATE OF CORRECTION

PATENT NO. : 12,163,665 B2
APPLICATION NO. : 16/505343
DATED : December 10, 2024
INVENTOR(S) : Thijs Wilhelmus Felix Maria Bouten It is certified that error appears in the above-identified patent and that said Letters Patent is hereby corrected as shown below:

In the Claims

Claim 1, Column 6, Line 58, "toa" should read --to a--.

Claim 10, Column 8, Line 29, "toa" should read --to a--.

Signed and Sealed this
Fourteenth Day of January, 2025

Derrick Brent
*Acting Director of the United States Patent and Trademark Office*